(12) United States Patent
Harper et al.

(10) Patent No.: US 8,270,108 B2
(45) Date of Patent: Sep. 18, 2012

(54) METHOD TO MINIMIZE THE EFFECTS OF TAPE SKEW AND TAPE DIMENSIONAL STABILITY

(75) Inventors: David H. Harper, Vail, AZ (US);
Robert A. Hutchins, Tucson, AZ (US);
Peter V. Koeppe, San Diego, CA (US);
Johnny L. Teale, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/549,531

(22) Filed: Aug. 28, 2009

(65) Prior Publication Data

US 2011/0051283 A1 Mar. 3, 2011

(51) Int. Cl.
*G11B 5/584* (2006.01)
*G11B 15/48* (2006.01)
*G11B 5/55* (2006.01)

(52) U.S. Cl. .................. 360/77.12; 360/74.1; 360/78.02

(58) Field of Classification Search .................. None
See application file for complete search history.

(56) References Cited

U.S. PATENT DOCUMENTS

| | | | |
|---|---|---|---|
| 4,903,150 A | 2/1990 | Juso et al. | |
| 5,027,245 A | 6/1991 | Nagata et al. | |
| 6,222,698 B1 | 4/2001 | Barndt et al. | |
| 7,193,812 B2 | 3/2007 | Eaton | |
| 7,239,465 B1 | 7/2007 | Watson | |
| 7,342,738 B1 | 3/2008 | Anderson | |
| 7,746,588 B2 | 6/2010 | Koeppe et al. | |
| 7,764,460 B2 * | 7/2010 | Bates et al. | 360/77.12 |
| 2003/0227702 A1 | 12/2003 | Watson | |
| 2006/0103968 A1 | 5/2006 | Jurneke | |
| 2006/0126212 A1 | 6/2006 | Anderson | |
| 2008/0158720 A1 | 7/2008 | Watson | |
| 2008/0259486 A1 * | 10/2008 | Biskeborn et al. | 360/75 |

OTHER PUBLICATIONS

International Search Report and Written Opinion for PCT/EP2010/062181, dated Nov. 16, 2010.

* cited by examiner

*Primary Examiner* — Andrew L Sniezek
(74) *Attorney, Agent, or Firm* — Hamilton & Terrile, LLP; Stephen A. Terrile

(57) ABSTRACT

A method, system and computer-usable medium are disclosed for performing data write and data read operations on a tape storage medium. A dual head/tape actuator assembly, comprising two head/tape actuator assemblies, is implemented to perform data write and data read operations on a tape medium. Each of the head/tape actuator assemblies comprises a set of data writer elements and a set of data reader elements. During data write operations, the data writer elements on one head/tape actuator assembly are used to write data to a tape medium and the data reader elements on the other head/tape actuator assembly are used to read the data from the tape medium. During read operations, half of the data readers on one head/tape actuator assembly are used to read data from half of the written data tracks on the tape medium and half of the data readers on the other head/tape actuator assembly are used to read the other half of the written tracks.

8 Claims, 5 Drawing Sheets

METHOD TO MINIMIZE THE EFFECTS OF TAPE SKEW AND TAPE DIMENSIONAL STABILITY

BACKGROUND OF THE INVENTION

1. Field of the Invention

Embodiments of the disclosure relate in general to the field of computers and similar technologies, and in particular to software utilized in this field. Still more particularly, it relates to providing a system, method, and computer-readable medium for performing data write and data read operations on a tape storage medium.

2. Description of the Related Art

Tape media continues to provide cost effective and reliable data storage. In recent years the data storage capacity of tape media, such as tape cartridges, has increased. Concurrently, there has been a corresponding decrease in tape cartridge form factors. One approach to increasing the capacity of a tape cartridge in future products is to write more tracks on the tape media. However, assuming the tape cartridge form factor remains constant, then the width of each written track will be reduced as the number of tracks increases.

A known consequence of smaller written track widths is read-after-write operations are more difficult to perform. In prior tape drives, the tape servo system positions the head according to writer elements and the reader elements are assumed to follow the writers. The tape system verifies that the data written to tape is good by immediately reading the data after it is written. However, as the track widths get smaller, the assumption that the reader elements are correctly positioned on the written track may not be valid. Misregistration of the tape due to small amounts of skew may result in the reader being positioned off of the written track, causing the read data to be invalid. Furthermore, as the written track widths get smaller, the effects of tape dimensional stability become more important. As a result, the expansion and contraction of tape with fluctuations in temperature must be factored into the margin between the width of the written track and the width of the read head. Accordingly, the effects of tape dimensional stability can be reduced if the span of the head can be reduced in a tape system, especially if the span of the head can be reduced without changing the format of the servo pattern on the tape.

Known approaches to addressing smaller written track widths in read-after-write operations include using a tilting roller to position the tape media such that there is no skew between the write elements and the reader elements. Another approach is to use a head with dual actuators where the read elements are placed on a separate actuator from the write elements. Thus, a servo system can be used to independently place the written tracks in known locations and position the read elements over the written tracks. However, tape dimensional stability remains an issue, especially if tape dimensional stability problems are consistent over a written tape as it could significantly increase the time required to recover data.

BRIEF SUMMARY OF THE INVENTION

The present invention includes, but is not limited to, a method, system and computer-usable medium for performing data write and data read operations on a tape storage medium. In various embodiments, a dual head/tape actuator assembly, comprising a first and second head/tape actuator assembly, is implemented to perform data write and data read operations on a tape medium. Each of the head/tape actuator assemblies comprises a set of data writer elements and a set of data reader elements. The head/tape actuator assemblies likewise comprise sets of servo head elements that are respectively associated with the data writer and data reader elements.

In various embodiments, the head/tape actuator assemblies are separate assemblies that are independently actuated using a fine actuator attached to each head module. In these and other embodiments, the servo, data reader, and data writer head architecture associated with head/tape actuator assemblies are identical. In various other embodiments, they are not required to be identical.

During data write operations, the data writer elements on one head/tape actuator assembly are used to write data to a tape medium and the data reader elements on the other head/tape actuator assembly are used to read the data from the tape medium. The data writer/reader element combinations are switched between forward and reverse directions. During read operations, half of the data readers on one head/tape actuator assembly are used to read data from half of the written data tracks on the tape medium and half of the data readers on the other head/tape actuator assembly are used to read the other half of the written tracks. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
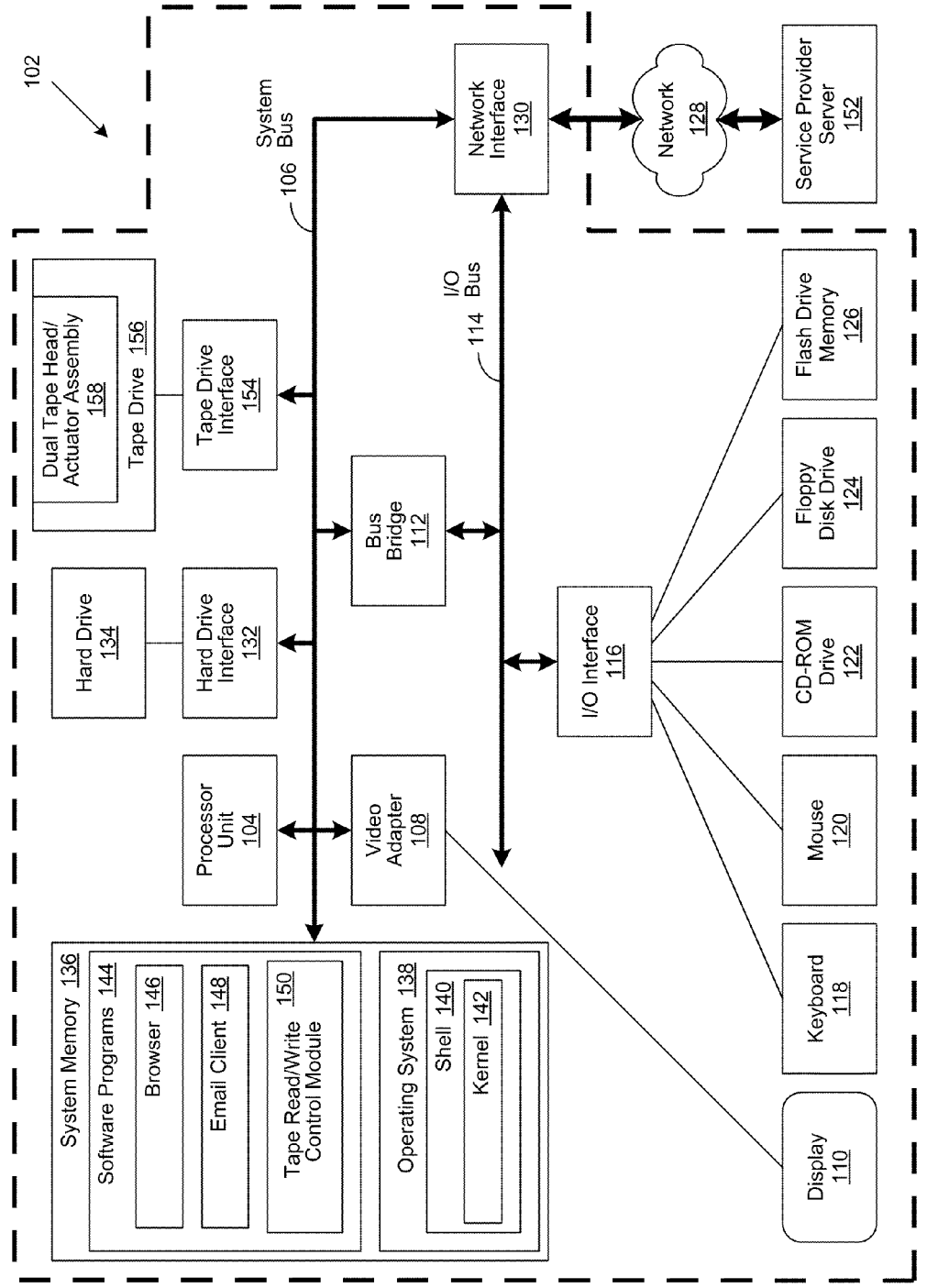
FIG. 1 depicts an exemplary client computer in which the present invention may be implemented.

A method, system and computer-usable medium are disclosed for performing data write and data read operations on a tape storage medium. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 and a tape drive interface 154 are also coupled to system bus 106. Hard drive interface 132 interfaces with a hard drive 134 and the tape drive interface 154 interfaces with a tape drive 156, which comprises a dual tape head/actuator assembly 158. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a tape read/write control module 150. The tape read/write control module 150 includes code for implementing the processes described in FIGS. 2-5 described hereinbelow. In one embodiment, client computer 102 is able to download the tape read/write control module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
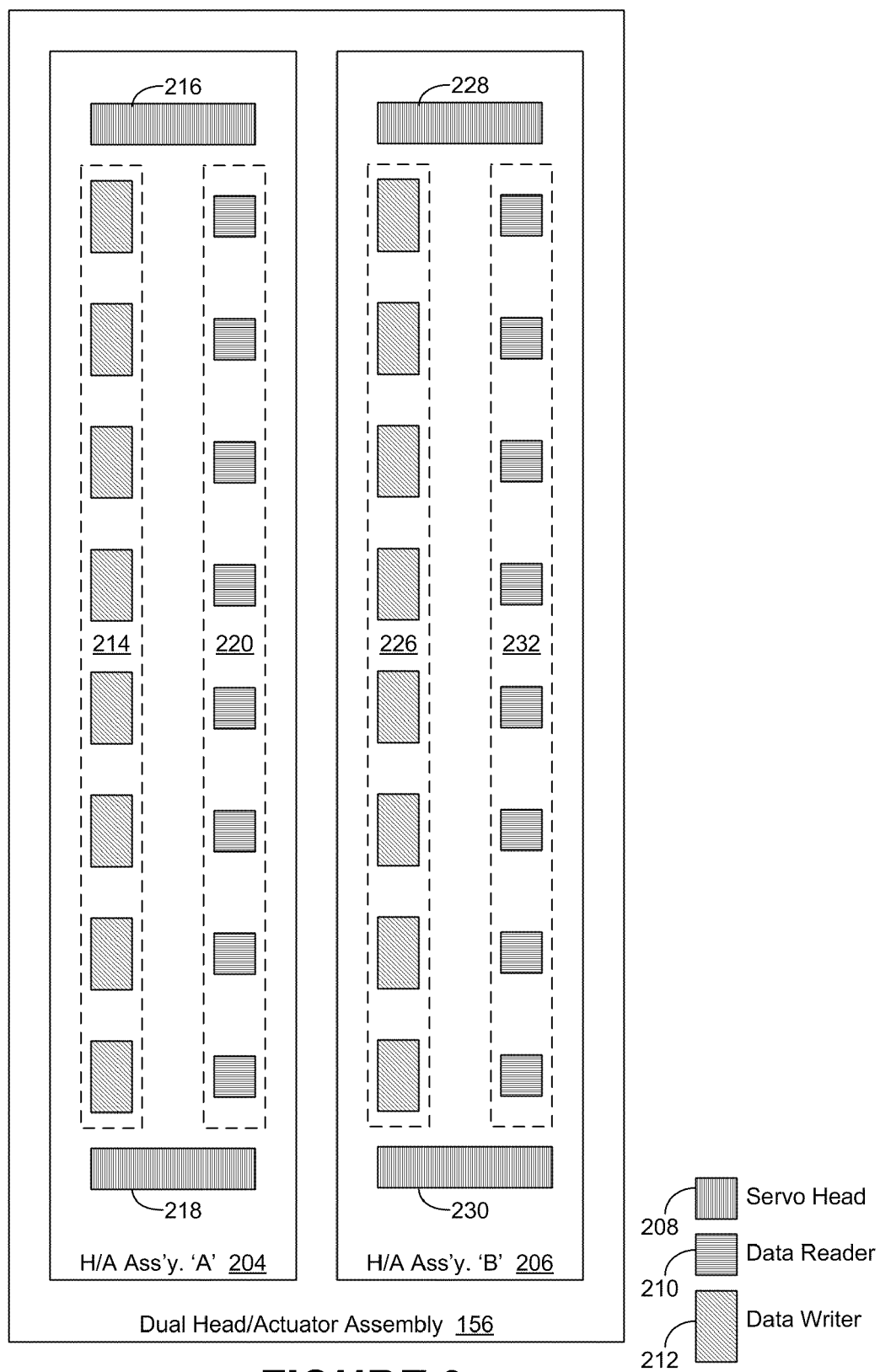
FIG. 2 shows a dual head/tape actuator assembly.

FIG. 2 shows a dual head/tape actuator assembly as implemented in accordance with an embodiment of the invention. As shown in FIG. 2, the dual head/tape actuator assembly 156 comprises a first head/tape actuator assembly 'A' 204 and a second head/tape actuator assembly 'B' 206. The head/tape actuator assembly 'A' 204 comprises a first set 214 of data writer elements 212, a first set 220 of data reader elements 210, and a first set of servo head elements 216, 218. Likewise, the head/tape actuator assembly 'B' 206 comprises a second set 226 of data writer elements 212, a second set 232 of data reader elements 210, and a second set of servo head elements 228, 230.

In various embodiments, the head/tape actuator assemblies 'A' 204 and 'B' 206 are separate assemblies that are independently actuated using a fine actuator attached to each head module. In these and other embodiments, the servo, data reader, and data writer head architecture associated with head/tape actuator assemblies 'A' 204 and 'B' 206 are identical. In various other embodiments, they are not required to be identical.

During data write operations, the data writer elements (e.g., 214) on one head/tape actuator assembly (e.g., 204) are used to write data to a tape medium and the data reader elements (e.g., 232) on the other head/tape actuator assembly (e.g., 206) are used to read the data from the tape medium. The data writer/reader element combinations are switched between forward and reverse directions. During read operations, half of the data readers 210 on one head/tape actuator assembly (e.g., 204) are used to read data from half of the written data tracks on the tape medium and half of the data readers 210 on the other head/tape actuator assembly (e.g., 206) are used to read the other half of the written tracks.

From the foregoing, it will be apparent to those of skill in the art that the effects of tape skew during a write operation can be significantly reduced by independently servoing the data writer 214, 226 and data reader 220, 232 elements of the dual head/tape actuator assembly 156. Furthermore, known read-after-write processes for verifying data can be used as in the past. Moreover, using data reader elements in groups that each span half the written data region allows the two heads to be separately positioned during a read operation. As a result, compensations for tape dimensional stability can be provided without requiring the tape drive to start and stop to recover all of the written data on a tape medium. Accordingly, the effect of tape dimensional stability can be reduced by a factor of two without changing the servo format on the tape medium.

Figure 3:
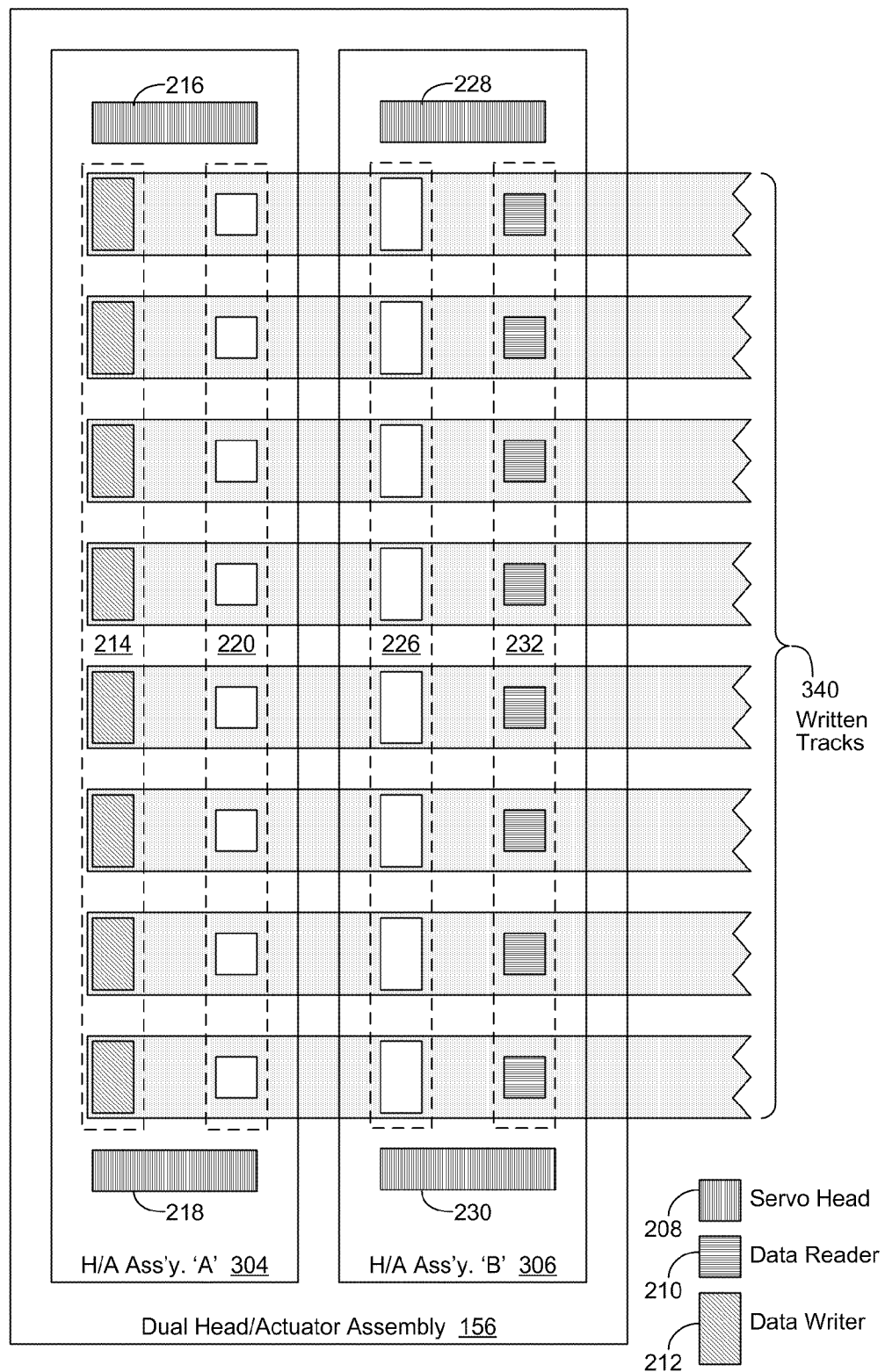
FIG. 3 shows a dual head/tape actuator assembly as implemented to perform a forward data write operation.
Figure 4:
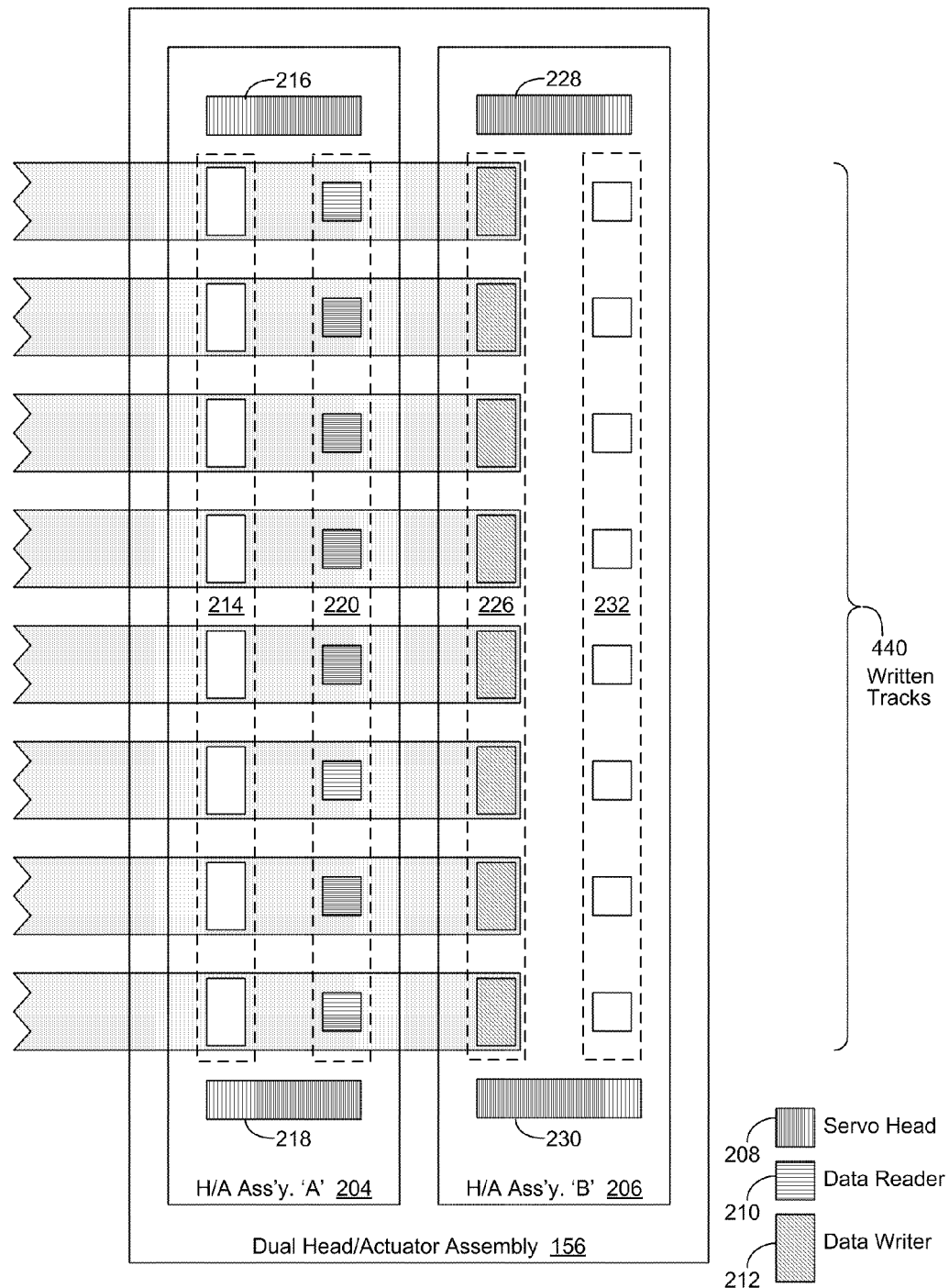
FIG. 4 shows a dual head/tape actuator assembly as implemented to perform a reverse data write operation.

FIG. 3 shows a dual head/tape actuator assembly as implemented in accordance with an embodiment of the invention to perform a forward data write operation. In this embodiment, the set 214 of data writer elements 212 of the head/tape actuator assembly 'A' 204 are used to write written tracks 340 in a forward direction on a tape medium. During data write operations, the servo head elements 216, 218 of the head/tape actuator assembly 'A' 204 are used to position the set 214 of data writer elements 212 over a target write location. Likewise, the servo head elements 228, 230 of the head/tape actuator assembly 'B' 206 are used to position the set 232 of data reader elements 210 over the tracks written 340 by the set 214 of data writer elements 212 of the head/tape actuator assembly 'A' 204. As shown in FIG. 4, the servo system controlling the head/tape actuator assembly 'B' 206 will independently track the data written by the set 214 of data writer elements 212 of head/tape actuator assembly 'A' 204 to reduce the effects of tape skew during data read operations.

FIG. 4 shows a dual head/tape actuator assembly as implemented in accordance with an embodiment of the invention to perform a reverse data write operation. In this embodiment, the set 214 of data writer elements 226 of the head/tape actuator assembly 'B' 206 are used to write written tracks 440 in a reverse direction on a tape medium. During data write operations, the servo head elements 228, 230 of the head/tape actuator assembly 'B' 206 are used to position the set 226 of data writer elements 212 over a target write location. Likewise, the servo head elements 216, 218 of the head/tape actuator assembly 'A' 204 are used to position the set 220 of data reader elements 210 over the tracks written 440 by the set 226 of data writer elements 212 of the head/tape actuator assembly 'B' 206. As shown in FIG. 4, the servo system controlling the head/tape actuator assembly 'A' 204 will independently track the data written by the set 226 of data writer elements 212 of head/tape actuator assembly 'B' 206 to reduce the effects of tape skew during data read operations.

Figure 5:
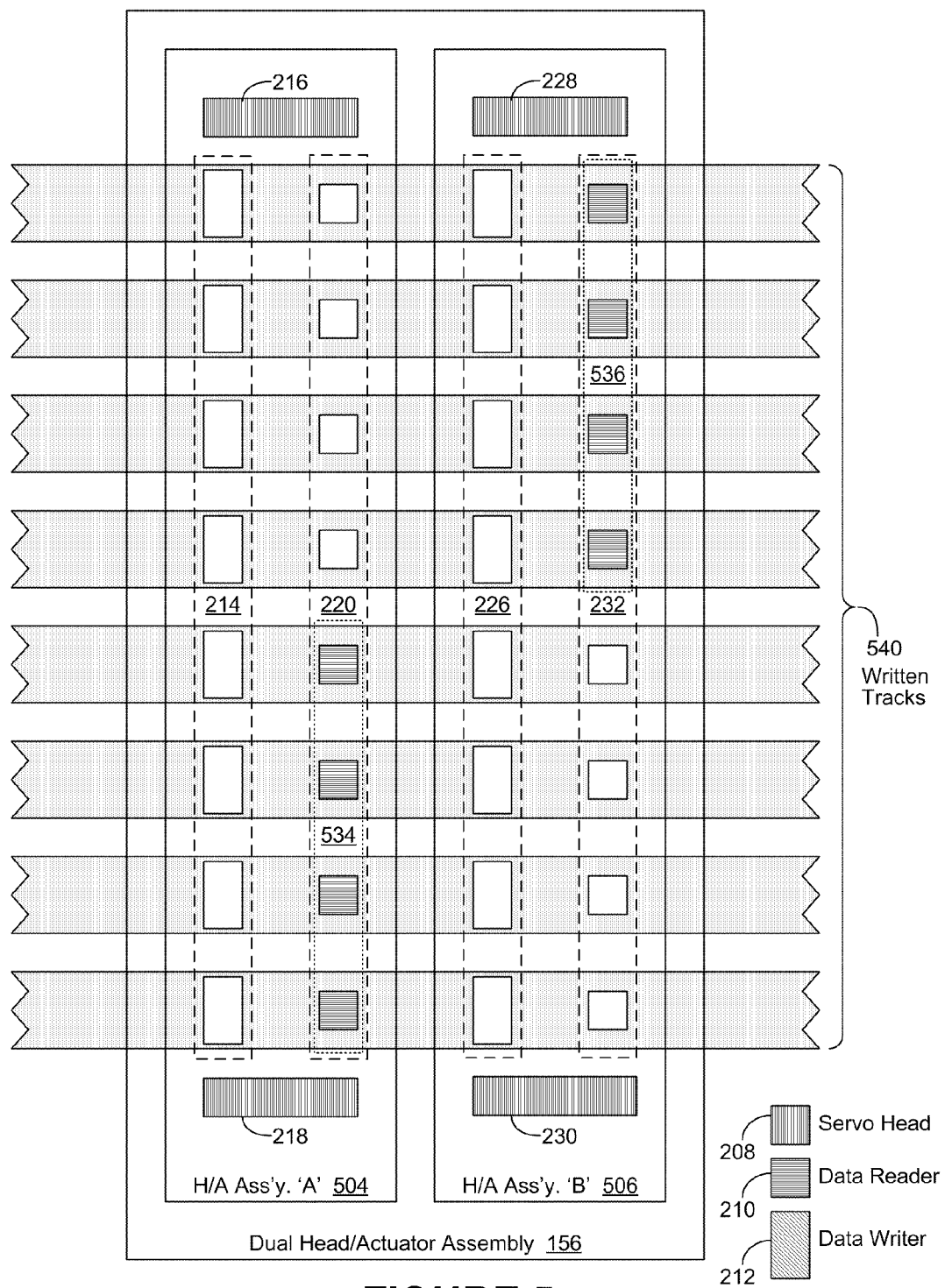
FIG. 5 shows a dual head/tape actuator assembly as implemented to perform a data read operation.

FIG. 5 shows a dual head/tape actuator assembly as implemented in accordance with an embodiment of the invention to perform a data read operation. In this embodiment, a subset 534 of the set 220 of data reader elements 212 of the head/tape actuator assembly 'A' 204 are used to read a first half of the written tracks 540 on a tape medium. Likewise, a subset 536 of the set 232 of data reader elements 212 of the head/tape actuator assembly 'B' 206 are used to read the other half of the written tracks 540 on a tape medium. During data read operations, the servo head elements 216, 218 of the head/tape actuator assembly 'A' 204 are used to position the subset 534 of the set 220 of data reader elements 212 over the first half of the written tracks 540. Likewise, the servo head elements 228, 230 of the head/tape actuator assembly 'B' 206 are used to position the subset 536 of the set 232 of data reader elements 212 over the other half of the written tracks 540.

As shown in FIG. 5, the servo system controlling the head/tape actuator assembly 'A' 204 will independently track the data read by the subset 534 of the set 220 of data reader elements 212. Likewise, the servo system controlling the head/tape actuator assembly 'B' 206 will independently track the data read by the subset 536 of the set 232 of data reader elements 212. As a result, using the head/tape actuator assemblies 'A' 204 and 'B' 206 to read the data from the written tracks 540 reduces the span of the head by a factor of two and allows the corresponding subsets 534, 536 of data reader elements 210 to be independently positioned over the written tracks 540. Accordingly the effect of tape dimensional instability during data read operations is reduced.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for performing data write and data read operations on a tape storage medium, comprising:
    controlling, via a processor, a dual tape head/actuator assembly comprising a first tape head/actuator and a second tape head/actuator, the first tape head/actuator and the second tape head/actuator being independently actuated via a first fine actuator attached to the first tape head/actuator and a second fine actuator attached to the second tape head/actuator;
    performing data write and data read operations on the tape storage medium via the dual tape head/actuator assembly, wherein:
    the first tape head/actuator performs data write operations on a tape storage medium; and
    the second tape head/head actuator performs data read operations on the tape storage medium; and wherein
    the first tape head/actuator comprises a first set of data writer elements, a first set of data reader elements, and a first set of servo elements; and
    the second tape head/actuator comprises a second set of data writer elements, a second set of data reader elements, and a second set of servo elements;
    the first set of data writer elements and the first set of data reader elements is associated with the first set of servo elements and the second set of data writer elements and the second set of data reader elements is associated with the second set of servo elements;
    when the tape medium is transported in a forward direction:
        the first set of servo elements position the first set of data writer elements over a target write location;
        the first set of data writer elements perform the data write operations;
        the second set of servo elements position the second set of data reader elements over the target write location; and
        the second set of data reader elements perform the data read operations; and,
    when the tape medium is transported in a reverse direction:
        the second set of servo elements position the second set of data writer elements over a target write location;
        the second set of data writer elements perform the data write operations;
        the first set of servo elements position the first set of data reader elements over the target write location; and
        the first set of data reader elements perform the data read operations;
    the first set of data reader elements span half of a written data region.

2. The method of claim 1, wherein:
    the first set of servo elements positions a subset of the first set of data reader elements over a first target write location;
    the subset of the first set of data reader elements performs a first portion of the data read operations;
    the second set of servo elements positions a subset of the second set of data reader elements over a second target write location; and
    the subset of the second set of data reader elements performs a second portion of the data read operations.

3. The method of claim 1, wherein the tape storage medium is contained within a tape cartridge.

4. A system comprising:
    a processor;
    a data bus coupled to the processor;
    a dual tape head/actuator assembly comprising a first tape head/actuator and a second tape head/actuatory; the first tape head/actuator and the second tape head/actuator being independently actuatable via a first fine actuator attached to the first tape head/actuator and a second fine actuator attached to the second tape head/actuator; and
    a computer-usable medium embodying computer program code, the computer-usable medium being coupled to the data bus, the computer program code performing data write and data read operations on a tape storage medium and comprising instructions executable by the processor and configured for:
        independently controlling the first tape head/actuator and the second tape head/actuator, the first tape head/actuator performing data write operations on a tape storage medium and the second tape head/head actuator performing data read operations on the tape storage medium; and wherein
    the first tape head/actuator comprises a first set of data writer elements, a first set of data reader elements, and a first set of servo elements;
    the second tape head/actuator comprises a second set of data writer elements, a second set of data reader elements, and a second set of servo elements;
    the first set of data writer elements and the first set of data reader elements is associated with the first set of servo elements and the second set of data writer elements and the second set of data reader elements is associated with the second set of servo elements;

when the tape medium is transported in a forward direction:
- the first set of servo elements position the first set of data writer elements over a target write location;
- the first set of data writer elements perform the data write operations;
- the second set of servo elements position the second set of data reader elements over the target write location; and
- the second set of data reader elements perform the data read operations; and, when the tape medium is transported in a reverse direction:
- the second set of servo elements position the second set of data writer elements over a target write location;
- the second set of data writer elements perform the data write operations;
- the first set of servo elements position the first set of data reader elements over the target write location; and
- the first set of data reader elements perform the data read operations;

the first set of data reader elements span half of a written data region.

5. The system of claim 4, wherein:
the first set of servo elements positions a subset of the first set of data reader elements over a first target write location;
the subset of the first set of data reader elements performs a first portion of the data read operations;
the second set of servo elements positions a subset of the second set of data reader elements over a second target write location; and
the subset of the second set of data reader elements performs a second portion of the data read operations.

6. The system of claim 4, wherein the tape storage medium is contained within a tape cartridge.

7. A non-transitory computer-usable medium embodying computer program code, the computer program code comprising computer executable instructions configured for:
controlling a dual tape head/actuator assembly comprising a first tape head/actuator and a second tape head/actuator, the first tape head/actuator and the second tape head/actuator being independently actuated via a first fine actuator attached to the first tape head/actuator and a second fine actuator attached to the second tape head/actuator, wherein:
the first tape head/actuator performs data write operations on a tape storage medium; and
the second tape head/head actuator performs data read operations on the tape storage medium; and wherein
the first tape head/actuator comprises a first set of data writer elements, a first set of data reader elements, and a first set of servo elements;
the second tape head/actuator comprises a second set of data writer elements, a second set of data reader elements, and a second set of servo elements;
the first set of data writer elements and the first set of data reader elements is associated with the first set of servo elements and the second set of data writer elements and the second set of data reader elements is associated with the second set of servo elements;

when the tape medium is transported in a forward direction:
- the first set of servo elements position the first set of data writer elements over a target write location;
- the first set of data writer elements perform the data write operations;
- the second set of servo elements position the second set of data reader elements over the target write location; and
- the second set of data reader elements perform the data read operations; and, when the tape medium is transported in a reverse direction:
- the second set of servo elements position the second set of data writer elements over a target write location;
- the second set of data writer elements perform the data write operations;
- the first set of servo elements position the first set of data reader elements over the target write location; and
- the first set of data reader elements perform the data read operations;

the first set of data reader elements span half of a written data region.

8. The computer usable medium of claim 7, wherein the tape storage medium is contained within a tape cartridge.

* * * * *